United States Patent [19]

Laporte

[11] Patent Number: 5,032,833
[45] Date of Patent: Jul. 16, 1991

[54] ADAPTIVE NETWORK ROUTING FOR POWER LINE COMMUNICATIONS

[75] Inventor: Eric Laporte, Roswell, Ga.

[73] Assignee: Schlumberger Industries, Inc., Norcross, Ga.

[21] Appl. No.: 343,644

[22] Filed: Apr. 27, 1989

[51] Int. Cl.⁵ .............................................. H04B 3/00
[52] U.S. Cl. ............................ 340/825.02; 340/825.06
[58] Field of Search ....................... 340/825.01, 825.02, 340/825.52, 310 A, 310 R, 826, 827, 825.06; 379/102, 107, 221; 370/13, 14, 61; 371/33; 364/200 MS File, 483, 492, 493; 307/40

[56] References Cited

U.S. PATENT DOCUMENTS

| | | | |
|---|---|---|---|
| 4,112,488 | 9/1978 | Smith, III | 364/200 |
| 4,241,237 | 12/1980 | Paraskevakos | 379/102 |
| 4,479,215 | 10/1984 | Baker | 371/33 |
| 4,692,761 | 9/1987 | Robinton | 340/825.01 |
| 4,788,721 | 11/1988 | Krishnan et al. | 379/221 |
| 4,811,011 | 5/1989 | Sollinger | 379/107 |
| 4,825,206 | 4/1989 | Brice, Jr. et al. | 340/825.02 |

Primary Examiner—Sandra L. O'Shea
Assistant Examiner—Dervis Magistre
Attorney, Agent, or Firm—Sanford J. Asman

[57] ABSTRACT

Optimum routing for communications between a central control unit (CCU) and remote units (nodes), such as electricity meters, distributed on an electrical power line is established by broadcasting from the CCU an interrogation signal to be received by the remote units. In response to a receipt of the interrogation signal, each remote unit returns an acknowledgement signal, time multiplexed with the acknowledgement signals of the other remote units, to the CCU which determines which units, if any, are "mute", i.e., have not acknowledged. The CCU then selects remote units in proximity to the mute remote units if it has already a good knowledge of the network or at random otherwise, to function as relays and repeats interrogation of the remote units via the relays. This process is repeated, if necessary, until communication paths between the CCU and all remote units are established directly or via delay units, to form maps. Numerous maps developed for the nodes during various time periods having different power line interference characteristics are stored in a data base to be accessed by the CCU to quickly establish an optimum route during subsequent periods having similar line interference characteristics.

34 Claims, 12 Drawing Sheets

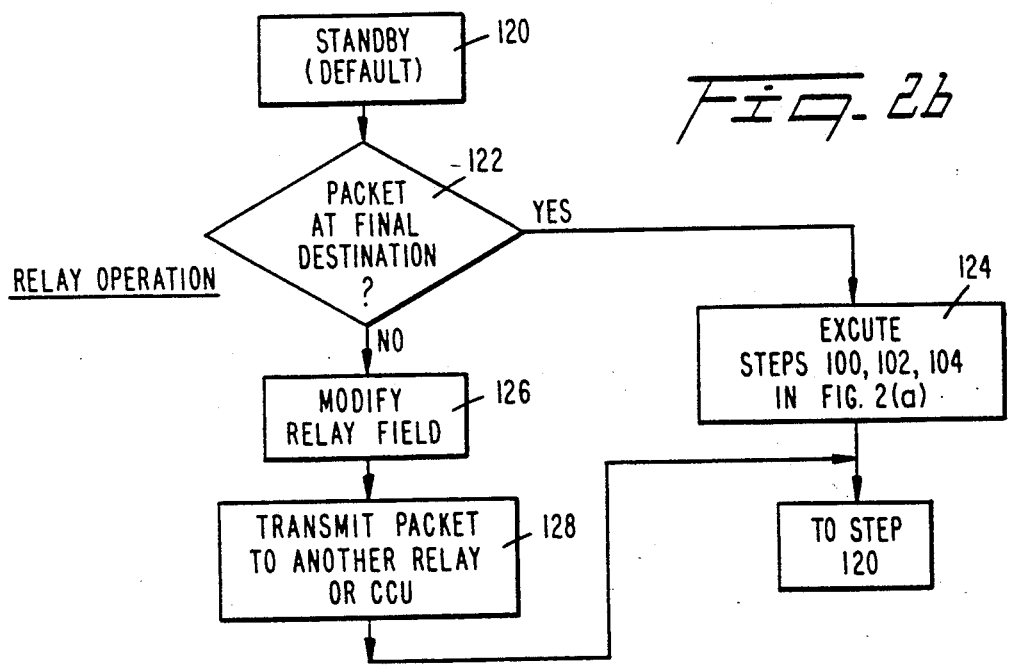
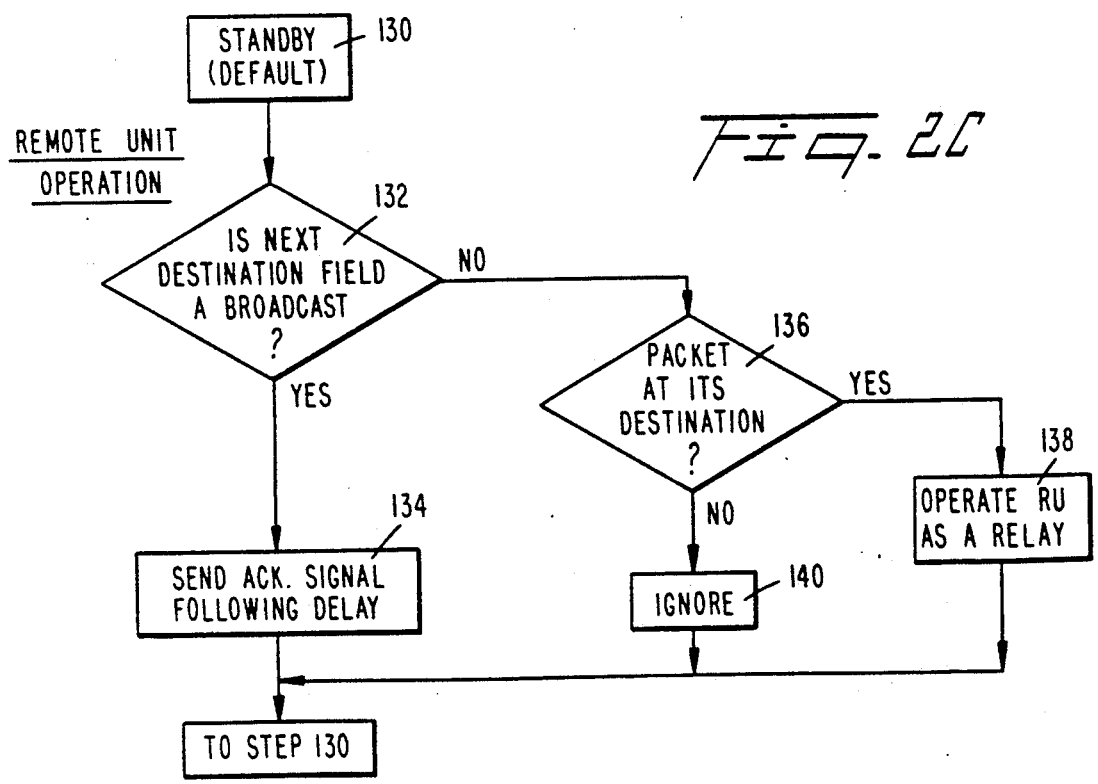

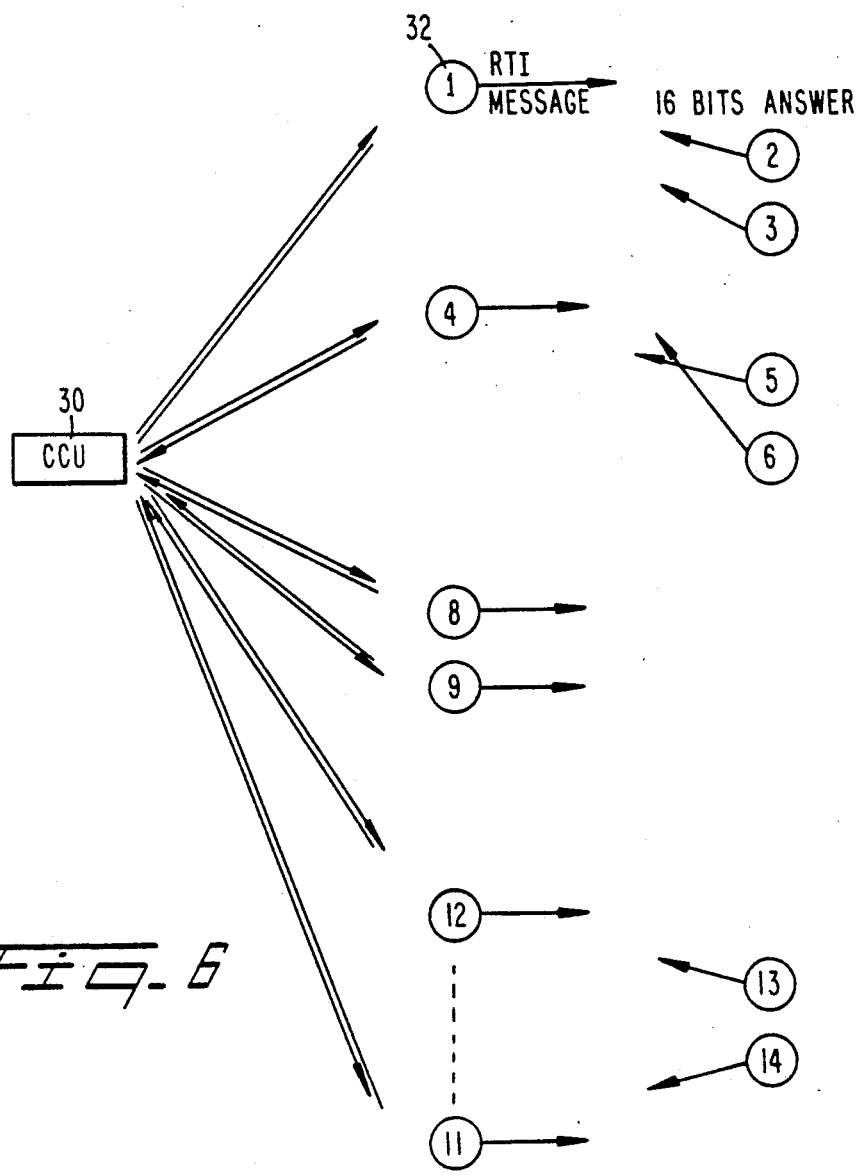

| |
|---|
| PREAMBLE: 32 BITS |
| NEXT DEST. ADDR. |
| CURR. SRC. ADDR. |
| PRIM. COMND: IND. POLLING |
| RELAY. PATH. FLAG |
| OUT VS IN |
| RELAY LENGTH |
| DATA LENGTH = 0 |
| HEADER CHECK DIGIT |
| |
| RELAY ADDRESS FIELD |

INDIVIDUAL POLLING

| N | 100 | 300 | 500 | 1000 |
|---|---|---|---|---|
| TOTAL TIME(s) | 15 | 44 | 72 | 143 |

Fig. 12a

| N | 100 | 300 | 500 | 1000 |
|---|---|---|---|---|
| DIRECT (s) | 15 | 44 | 72 | 143 |
| 1 RELAY (s) | 2610 | 19170 | 40050 | 164700 |
| 2 RELAY (s) | 150 | 1110 | 2737 | 20700 |
| 3 RELAY (s) | 0 | 0 | 0 | 850 |
| TOTAL TIME | 2775s 46mn | 20324s 5h 38mn | 51859s 14h 24mn | 186393s 2d 3h 46mn |

Fig. 12b

| N | 100 | 300 | 500 | 1000 |
|---|---|---|---|---|
| DIRECT (s) | 15 | 44 | 72 | 143 |
| 1 RELAY (s) | 2320 | 17040 | 43600 | 146400 |
| 2 RELAY (s) | 752 | 4464 | 12765 | 36800 |
| 3 RELAY (s) | 117 | 400 | 1072 | 4096 |
| TOTAL TIME | 3204s 53mn | 21948s 6h 05mn | 57509s 15h 58mn | 187439s 2d 4h 04mn |

Fig. 12c

| N | 100 | 300 | 500 | 1000 |
|---|---|---|---|---|
| DIRECT (s) | 253 | 760 | 1265 | 2534 |
| 1 RELAY (s) | 5640 | 50760 | 141000 | 564000 |
| 2 RELAY (s) | 47 | 421 | 1170 | 8424 |
| 3 RELAY (s) | 0 | 0 | 0 | 68 |
| TOTAL TIME | 5940s 1h 39mn | 51941s 14h 25mn | 143435s 1d 15h 50mn | 572492s 6d 15h 01mn |

Fig. 12d

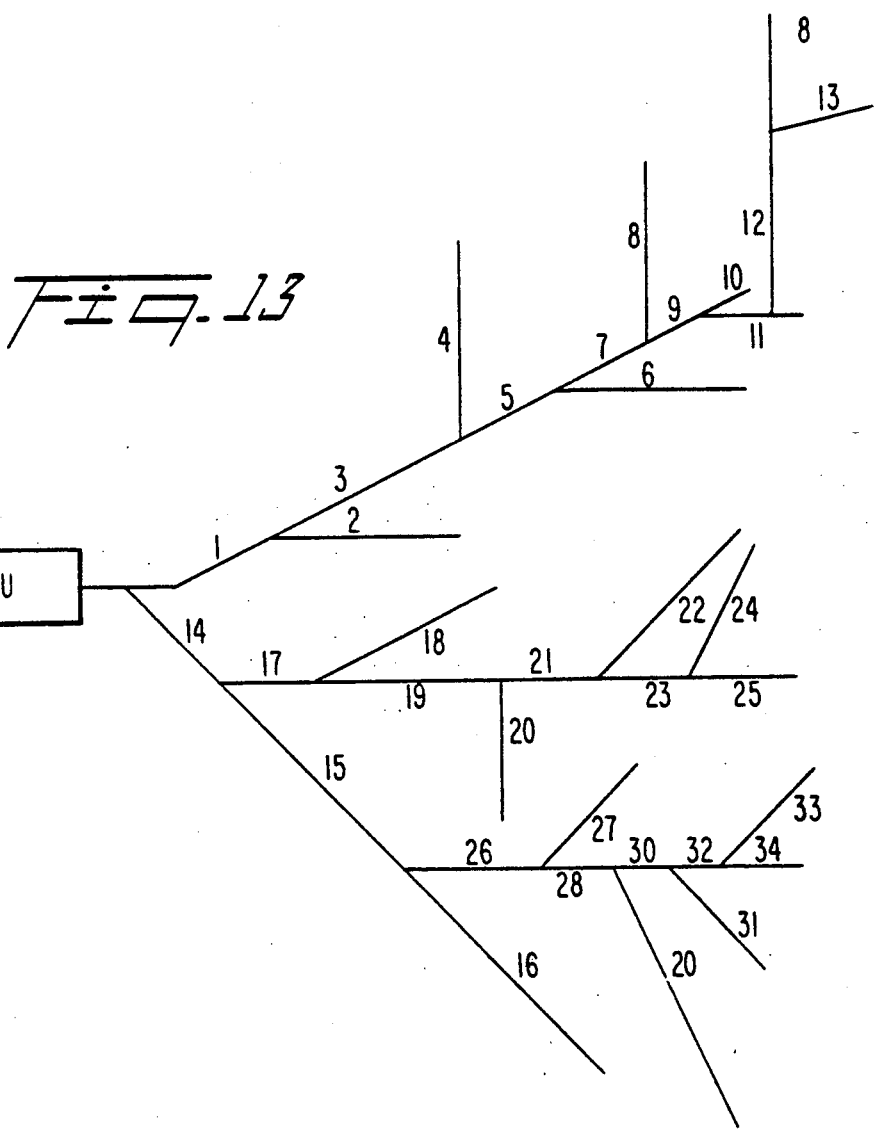

| BER | 10% | 6% | 5.5% | 5% | 1% |
|---|---|---|---|---|---|
| OUTBOUND MER | 76% | 26.4% | 20.8% | 15.7% | $4.6 \; 10^{-4}$ |
| INBOUND MER | 88.5% | 37.3% | 30% | 23% | $7.3 \; 10^{-4}$ |
| TOTAL MER | 97.3% | 53.4% | 44.4% | 35% | 0.12% |
| MER 3 TRIES | 92% | 15.2% | 8.8% | 4.3% | $1.2 \; 10^{-7}$ |

| $C_1$ | $M_a$ |
|---|---|
| $C_2$ | $M_b$ |
| $C_3$ | $M_c$ |

DATA BASE

ADAPTIVE NETWORK ROUTING FOR POWER LINE COMMUNICATIONS

TECHNICAL FIELD

This invention relates generally to power line communications, and more particularly, to adaptive routing of communications between a central unit and a plurality of remote units on an electrical power line, in the presence of line noise that is distributed on the power line and varies with time.

BACKGROUND ART

In some types of communications networks, data stored in remote, data accumulation units are downloaded to a central computer or record keeping unit, periodically or on demand. For example, in electricity or other utility meter reading systems, to which the present invention is particularly advantageous but not necessarily limited, remote watthour meters are polled by a central computer which maintains customer electricity consumption records for billing. Typically there has been one centralized meter for each single-family home or for each apartment building occupied by a number of families, as well as for each single or multi-tenant commercial property, polled by a regional computer. It is preferable to monitor the electricity consumption of each user, rather than a community of users, to produce more equitable, individualized billing. However, it frequently is impractical to install separate meters in individual units, particularly in older apartment buildings, because there usually is no separate data communications line between each unit and a central site. Rewiring of the building is cost prohibitive. Accordingly, power lines provided to each unit and to which all meters are connected are used by the meters for transmitting electricity consumption data to a central computer. This is carried out by a transmitter in each meter which injects on the power lines a carrier signal modulated by data identifying the meter and reporting its consumption during a predetermined billing period.

However, because power lines are electrically noisy, it is difficult to establish a reliable communications link between the meters and the central computer using a reasonably small amount of signal power. Furthermore, the noise spectrum of the power lines changes with time of the day and season of the year depending on operation of electrical equipment connected, or located in proximity, to the power lines. For example, power line network characteristics have variations in attenuation as a function of frequency, with pronounced dips in transmission of some frequencies that vary among networks. Noise injected on the lines includes fixed frequency noise resulting, for example, from the switching of inductive loads. Other noise arises at harmonics of the frequency of the network, and there is gaussian background noise as well as fluctuating signals caused by appliances operating on the power lines.

Accordingly, one object of the invention is to provide a method of and system for establishing reliable communications between local and remote data reporting equipment.

Another object of the invention is to provide apparatus and methodology for establishing communications between central and remote units coupled to each other on an electrical power line wherein communications networking is carried out adaptively to route signals between the central and remote units along paths that tend not to be affected substantially by line noise.

Still another object is to provide reliable power line communications method and apparatus suitable for centralized meter reading.

Adaptive networks for selecting optimum signal paths on a power distribution network are known in the prior art. In Robinton U.S. Pat. No. 4,692,761, a power line based communication system for downloading data from remote units to a master unit on the electrical power line implements primary units at the nodes of the network that are capable both of transmitting and receiving messages and secondary units that are capable only of transmitting messages. Messages are transmitted between the remote units and the master unit in the form of data packets including power consumption data produced by a power meter associated with the initiating remote unit, addresses of source and destination nodes and data indicating whether the message is an up link message or a down link message. Additional data included in the packet indicate whether the message has arrived at its final destination or at an intermediate destination for relaying. Intermediate destination addresses are determined by information indicative of network conditions, such as the amount of noise, and present in messages transmitted by the originating or relaying node.

While generally satisfactory, this type of system is very complex, requires substantial data processing capabilities in nodes distributed throughout the network and is generally impractical for large systems, such as ones on the order of at least one thousand nodes, that may exist in large commercial or residential buildings or complexes. The number of units capable of operating as relays is limited and predetermined. The system furthermore is believed not to respond quickly to new adverse line noise conditions to develop new, more reliable, communication paths because the total path finding procedure must be implemented each time a communication is attempted.

Accordingly, another object of the invention is to provide an improved adaptive communications network that is less complex than adaptive communications networks known in the prior art.

Yet another object of the invention is to provide an adaptive communications network and method wherein the amount of data processing required therein is concentrated in a central control unit, not distributed throughout the network nodes.

Still a further object is to provide an adaptive communications network wherein new optimum communication paths as required are selected in a relatively short time period.

Another object is to provide an adaptive communications network wherein the number of nodes and the number of relays therein are unlimited.

DISCLOSURE OF THE INVENTION

The above and other objectives are satisfied, in accordance with one aspect of the invention, by providing a novel method of routing communications between a central control unit (CCU) and a plurality of remote units (nodes) distributed on an electrical power line, wherein the CCU and remote units are capable both of receiving and transmitting electrical signals. The method includes a "real time interrogation" (RTI) mode of operation wherein the CCU first establishes, directly or via relays, a route for communications with each remote unit on the power line. The CCU then establishes a "data transfer" mode of operation for downloading data accumulated the remote units to the CCU.

In the RTI mode of operation, also termed "global RTI", the CCU broadcasts on the power line a first interrogation signal to be received by the plurality of remote units on the line. Each of the remote units that has received the first interrogation signal returns to the CCU a first acknowledgement signal that is capable of being discriminated from the first acknowledgement signals of the other remote units. Preferably, the acknowledgement signals are staggered in time, i.e., a different time slot is dedicated to each remote unit. The CCU, in response, correlates each acknowledgement signal received with the remote unit that transmitted it and identifies any remote units that are "mute", i.e., remote units that have not established communications with the CCU. The CCU now selects a remote unit, in proximity to at least one of the mute units if it has a prior knowledge of the network, meaning it has already built a map of the physical location of the units, or at random if it does not know enough about the physical location of the unit yet, to operate as a relay for transmitting a second interrogation signal to the remote units designated as being mute. Each remote unit, designated previously as mute, upon receipt of the second interrogation signal transmits a second acknowledgement signal to the relay which in turn transmits the signal to the CCU after it has received every possible answer. This sequence of selecting and implementing relays to establish communications between the CCU and remote units is repeated until none of the remote units are mute.

In accordance with a further aspect of the invention, first, second and third levels of relays at locations successively farther displaced from the CCU are selected for relaying packets during the RTI mode. When a relatively small number of remote units remain designated as mute, following an RTI operation, polling of the remaining mute units may be carried out by determining a first distance between a remote unit designated to be a "first level" relay and a remote unit designated as being mute, and if the first distance is less than a first predetermined distance, a first bidirectional signal transfer between the first level relay and the remote unit designated as being mute is implemented. If the first bidirectional signal transfer is unsuccessful, a second distance between a "second level relay" and the remote unit designated as being mute is determined, and if the second distance is less than a second predetermined distance, a second bidirectional signal transfer between the second level of relay and the remote unit designated as being mute is carried out. Next, if the second bidirectional signal transfer is unsuccessful, a third distance between a "third level relay" and the remote unit designated as being mute is made. If the third distance is less than a third predetermined distance, a third bidirectional signal transfer between the third level of relays and the remote unit designated as being mute is made to complete polling of the remaining mute remote units for establishing a communication path from the CCU to the remaining remote units. Preferably, the first, second and third predetermined distances are the same.

In accordance with another important aspect of the invention, adaptive learning implemented in the system develops a data base of network path maps as a result of the implementation of previous RTI procedures. The maps, which correspond to sets of communication paths for the node of the network during a slice of time when conditions on the network are constant, are selected by the CCU when the same network conditions are likely to recur, e.g., possibly based on the time of day, day of week and season. The maps are stored in the data base in association with corresponding map selection data, such as environmental conditions that existed when each map was produced. When necessary as a result of changing line conditions, new maps are accessed from the data base to change the routing of transmissions between the CCU and remote units.

The map selection data include a confidence factor for each map describing the probability that communications between the CCU and the remote units along a path defined by each map during a particular time period will be successful. The confidence factor for each map is determined by measuring the percentage of successful communications between said central and remote units during a particular time.

The method and system of this invention accordingly provide an adaptive communications network particularly useful for establishing reliable communication paths in electrically noisy environments, such as in power line carrier systems. The RTI mode of operation of the CCU for establishing the paths, which concentrates all decision making within the CCU, is more easily implemented than systems of the prior art of the type wherein the "intelligence" is distributed among the nodes of the network. Furthermore, the self learning process of the invention implementing storage and accessing of network maps for the nodes, obtained during previous RTI procedures, enables the CCU to converge quickly to a new set of communication paths in response to changed network conditions.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 2(a), 2(b) and 2(c) are flow charts of programming for controlling the CCU, relays and remote units to operate in the real time interrogation (RTI) mode of operation.

FIG. 5 is a diagram of a message packet transmitted by the CCU during each real time interrogation.

FIG. 6 is a symbolic diagram showing a second level of real time interrogation of the remote units.

FIGS. 12(a)-12(d) are tables showing durations of time required for developing maps using RTI and polling procedures.

FIG. 13 is a tree diagram showing a sample network interconnecting the CCU and a number of remote units.

FIG. 14 is a logical diagram equivalent to the tree diagram of FIG. 13.

BEST MODE FOR PRACTICING THE INVENTION

Figure 1:
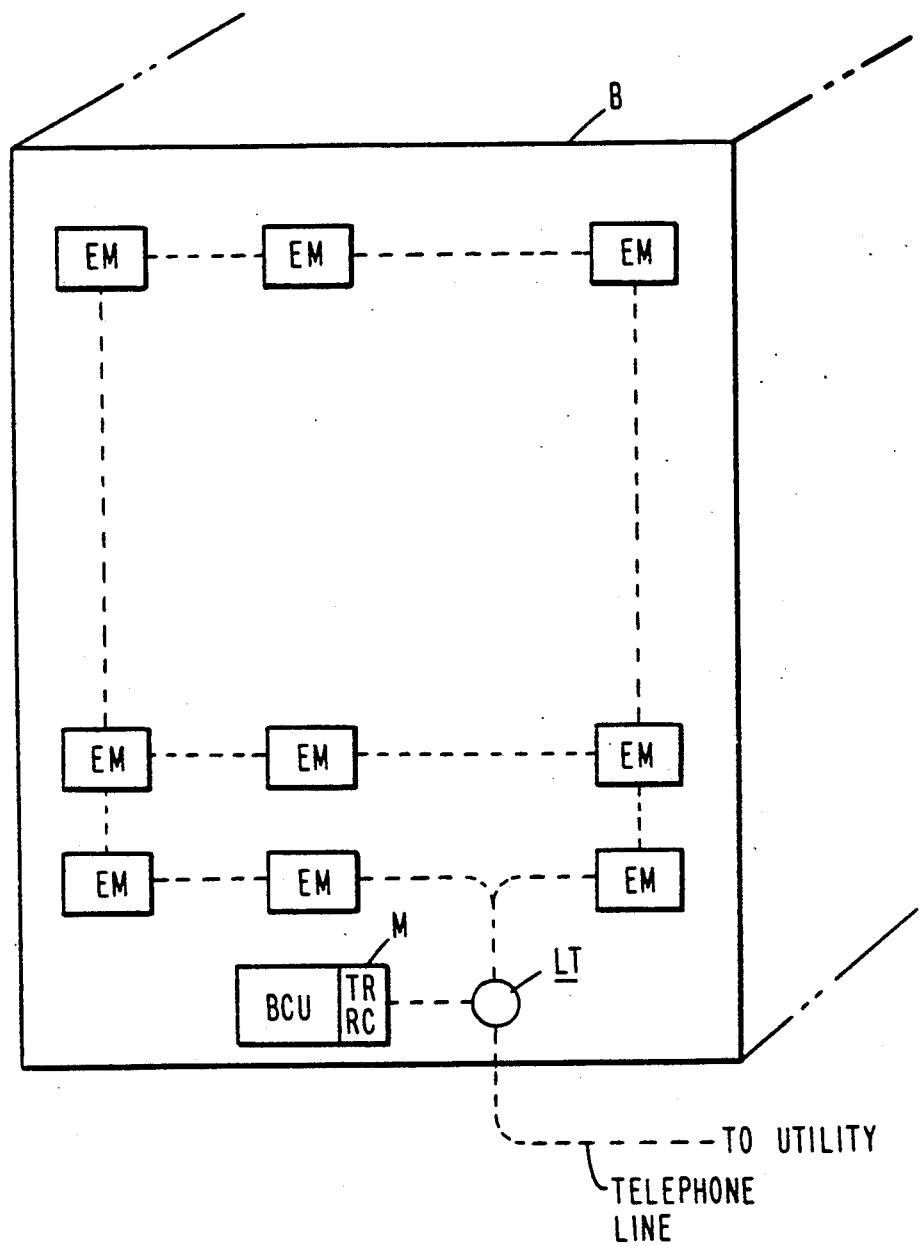
FIG. 1 is a symbolic drawing of a multiple tenant building containing a large number of individual units having energy meters distributed on the power lines and a building control unit for polling the energy meters to accumulate individualized energy consumption data for customer billing or other purposes.

With reference to FIG. 1, the environment to which the invention may be applied but is not limited, includes, as shown, an apartment building B that may have a large number of individual apartments therein, each being provided with electricity by a commercial utility over a common set of power lines PL. Distributed on the power lines PL, and located within the individual units, are electricity meters EM which monitor and accumulate electricity consumption in each unit. Periodically, or on demand, the electricity meters EM are polled by a central control unit CCU centrally located in the building B and consisting of or containing a local computer which may be a "personal computer" having a modem M and a line interface LI for coupling a modulated carrier signal between the CCU and the power line PL. Each electricity meter EM further includes a modem and line interface to enable bidirectional communications between the EM and the CCU to take place over the power lines directly, if the two are on a common power transformer, or through an optional coupler or other type isolator if the two are on different transformers. Communication between the local CCU and any remote CCU at the utility is carried out preferably over telephone lines (not shown).

Systems are known in the prior art for carrying out relatively noise immune power line carrier communication using low frequency, wide band, signal demodulation. A line synchronized system using frequency hopping type spread spectrum signal modulation and demodulation for power line carrier communication is described in copending application Ser. No. 07/343202 filed on Apr. 26, 1989, now U.S. Pat. No. 4,968,970, entitled "Method of and System for Power Line Carrier Communications", assigned to the assignee of this invention. That application discloses non-coherent, quadrature, homodyne demodulation of a power line carrier modulated by digital data to be sent in packets between a central control unit (CCU) and a plurality of remote units (RU) such as energy meters for data acquisition. The present invention, on the other hand, provides two aspects of adaptive networking for power line carrier communications wherein, first, optimum communication paths between a CCU and a plurality of remote units are determined using "real time interrogation" (RTI) of the remote units, and second, a "self learning" system wherein the results of RTI provide a data base of network maps each associated with a set of node paths that were functional during a common slice of time. Upon downloading of the remote units to the CCU for data acquisition, the data base is accessed to select a new set of node paths using a map that is based on network characteristics similar to network characteristics that existed at the time the map was made.

RTI, in accordance with the invention, is an initial mode of operation wherein the CCU interrogates the remote units of the same network to determine paths that will enable the CCU to establish communications with all the units. Real time interrogation uses time multiplexed communications with the remote units; this is different from conventional hand-shaking protocol, wherein the CCU would establish communications with each remote unit, one at a time, and in succession. Hand-shaking protocol, also known as "individual polling", shall be described in more detail hereinafter.

In accordance with real time interrogation (RTI), the CCU first broadcasts a message to be received by every remote unit of the network. Each unit which receives the interrogation message returns a short acknowledgement message following a predetermined delay associated with that unit. The CCU, by associating each time slot with each remote unit, can determine which of the units are "active", i.e., are in communication with the CCU, and which of the units are "mute" with respect to a communication path selected. Further in accordance with RTI, if no communication path can be established between the CCU and a particular remote unit directly, i.e., the particular unit is mute, the CCU selects another remote unit, near the one designated as being mute if it already knows the topology of the network, or at random otherwise, to operate as a relay remote unit. The relay remote unit is controlled by the CCU to transmit another interrogation signal, similar to the one initially broadcast by the CCU to the relay remote units, and to relay acknowledgements from those units in a mode of operation called "first level relaying". If some remote units are determined by the CCU to be still mute, the process is repeated using an additional level of relay remote units. The process may be repeated again to provide three levels of relaying, if necessary, to establish a path from the CCU to all the remote units in the RTI mode of operation.

Figure 2A:
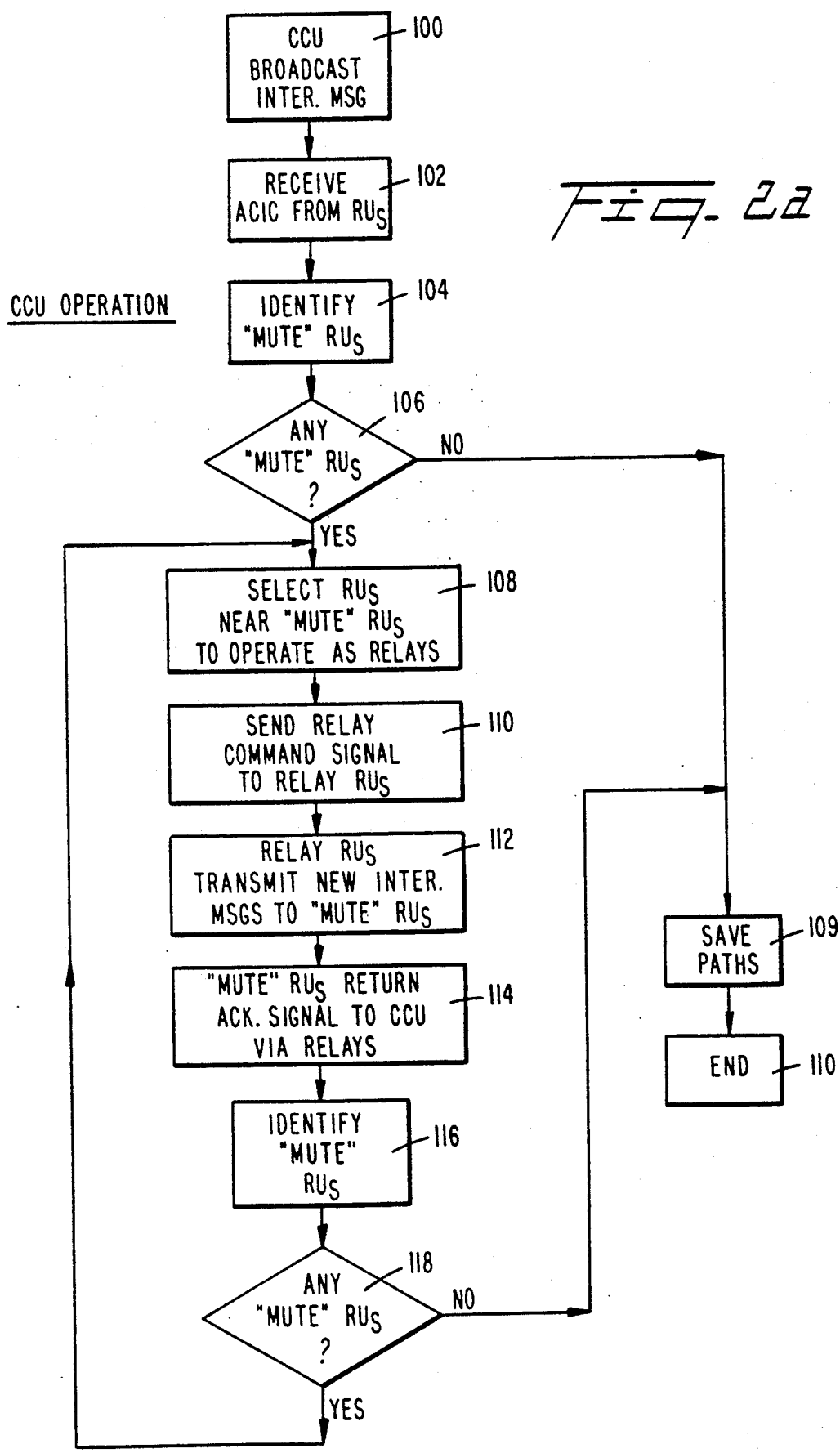
Figure 3:
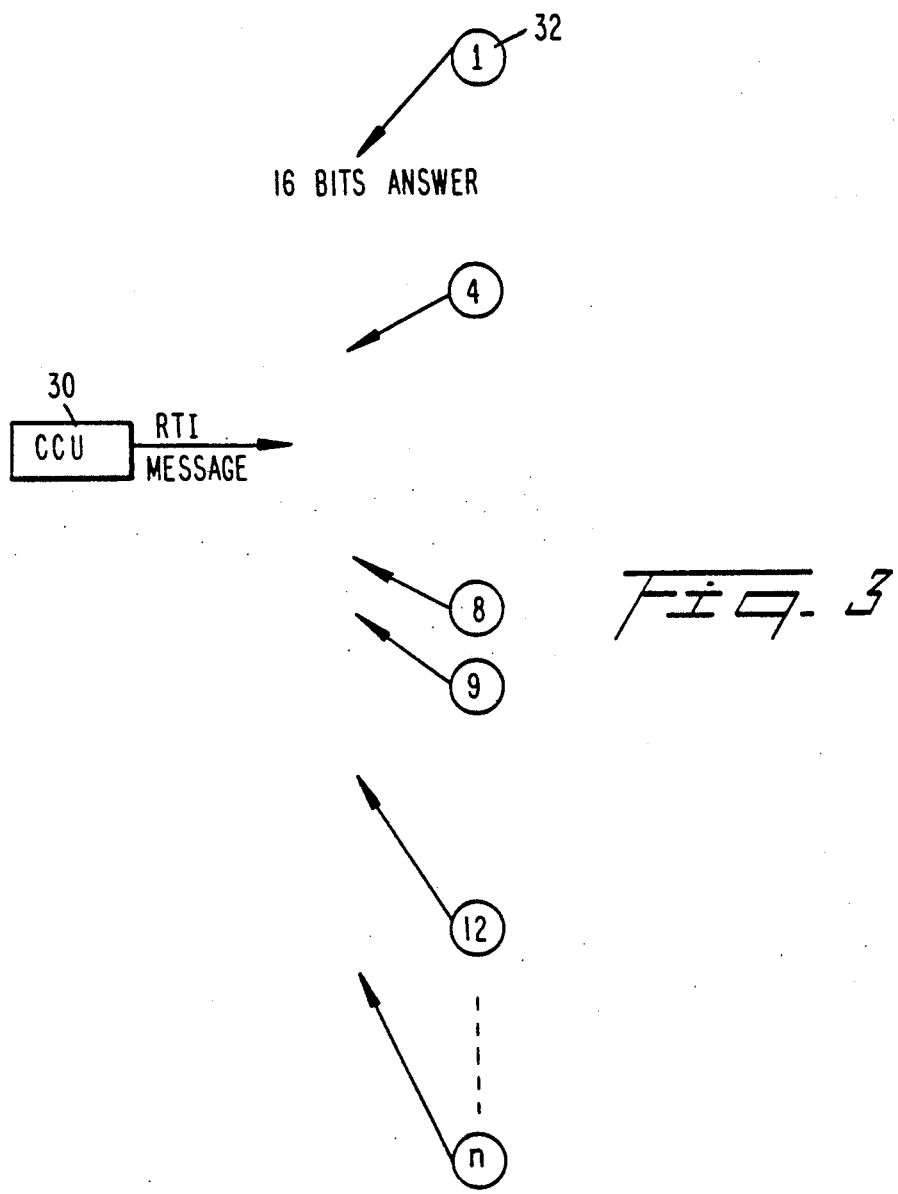
FIG. 3 is a symbolic diagram showing a first level of real time interrogation of remote units by the CCU.

Referring to FIG. 2(a), a program routine for controlling the CCU to carry out real time interrogation, as described, provides broadcasting of an interrogation message to be received by all remote units thereon (step 100). This interrogation message, designated "RTI message" in FIG. 3, may be transmitted by CCU 30 using frequency hopping spread spectrum signal processing in the manner described in the copending application, supra, although other forms of power line carrier signal transmission can be used. The interrogation message is in the form of data packets preferably having the protocol shown in FIG. 5, with a 32 bit synchronization pattern being transmitted at the beginning of the packet, as shown. The purpose of the synchronization pattern is to enable the receiving remote unit, or the CCU during an acknowledgement (any load on the power line, i.e., CCU or remote unit is sometimes generically termed "node"), to distinguish the start of the message from a constant incoming bit stream. Packet synchronization, being well known, is for brevity not described in detail herein.

The remaining fields, other than the relay field in the packet, comprise a header field which provides the minimum information required in a packet for communication on the network. The synchronization pattern and header fields constitute the minimum necessary for packet communication on the network. The header contains addressing, command and optional field length information; subfields of the header are provided as shown in FIG. 5. Finally, the relay field specifies the addresses of nodes in the network to serve as relays for the packet, as described in more detail hereinafter. The relay field is optional in the packet; a packet received at a relay node in the network is decoded and corrected, and then examined for the next address in the path indicated in the packet. The packet then is re-encoded and repacked prior to retransmission of it on the network.

Another optional field in the packet is the data block. The size of the data field, if present, is specified by the data length field of the header; the content and structure of information in the data block depend on the particular command value in the header. However, during real time interrogation, no data are carried by the packet since the purpose of the RTI packet merely is to establish a communication path, not to download data to the CCU.

Typically, the bit stream transferred on the power line network will undergo varying levels of corruption as a result of power line noise, etc. To improve reception of valid data, redundant coding preferably is included in the packet to allow the receiving node to determine if errors have corrupted the data. In the preferred embodiment, the code selected is Golay (24, 12), which is capable of correcting any combination of three or fewer random errors and detecting four bits in error in each block of 24 bits. For every twelve bits of information to be transmitted across the network, twelve redundant Golay encoded bits are included. A check digit, provided at the end of each packet, also is Golay encoded, yielding a total of 24 bits per check digit. Data determined to be incorrigible must be retransmitted.

Figure 4:
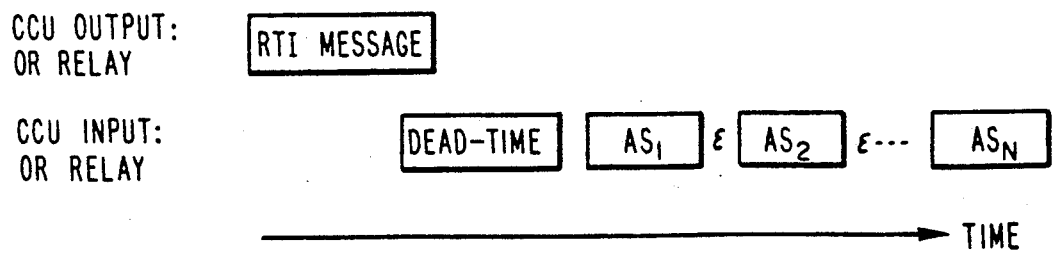
FIG. 4 is a timing diagram of the first level of real time interrogation.

Returning to FIG. 2(a), each remote unit 32, designated as 32(l) . . . (n) in FIG. 3, that receives the interrogation message from CCU 30, returns a very short acknowledgement message (identified as "16 bits answer" in FIG. 3). The acknowledgement messages from remote units 32, received in step 102, are staggered in time, each is delayed by a predetermined different delay time as shown in FIG. 4. By associating each acknowledgement with the time slot within which the acknowledgement was received, CCU 30 can determine which, if any, of the remote units 32 are "mute" (step 104). A remote unit herein is designated as being "active" if it is capable of communicating with the CCU 30 over a particular path, and as "mute" if it cannot.

If none of the remote units 32 is determined to be mute, in step 106, the network is considered to be functional throughout and program jumps to step 109 wherein all paths to the various nodes on the network are stored to form "maps", described in detail hereinafter, and this routine of the program ends (step 110). If at least one remote unit is determined to be mute in step 106, on the other hand, the program continues to step 108 wherein the CCU 30 selects a remote unit, near a unit designated as being "mute" to operate as a relay. This aspect of real time interrogation is termed "second layer relaying", and is shown in FIG. 6 with remote units 32 (2, 3, 5, 6, 13 and 14) designated as being mute and with units 32 (1, 4, 8, 9, 12 . . . n) being selected to operate as relays. The CCU 30 now transmits an interrogation signal having the format shown in FIG. 5, to set a flag in the remote units selected to operate as relays. Following a delay, the CCU 30 then transmits to each relay remote unit a message or packet having the protocol shown in FIG. 7(a), with a preamble header, an address field identifying the addresses of any relays and a data field that defines the addresses of the first and last remote units from which information is requested, as provided in step 110 of FIG. 2(a).

The remote units 32 previously designated as being mute, that have received the interrogation signals transmitted by relay remote units 32 (1, 4 . . . n), now return, via the relays, second acknowledgment signals to be received by the CCU 30 (step 112). The acknowledgment signal between the relay and the CCU is in the form of a packet having the protocol shown in FIG. 7(b) with a preamble, header, address of the relay remote unit in the return path and a data field containing information provided by the remote unit.

Figure 8:
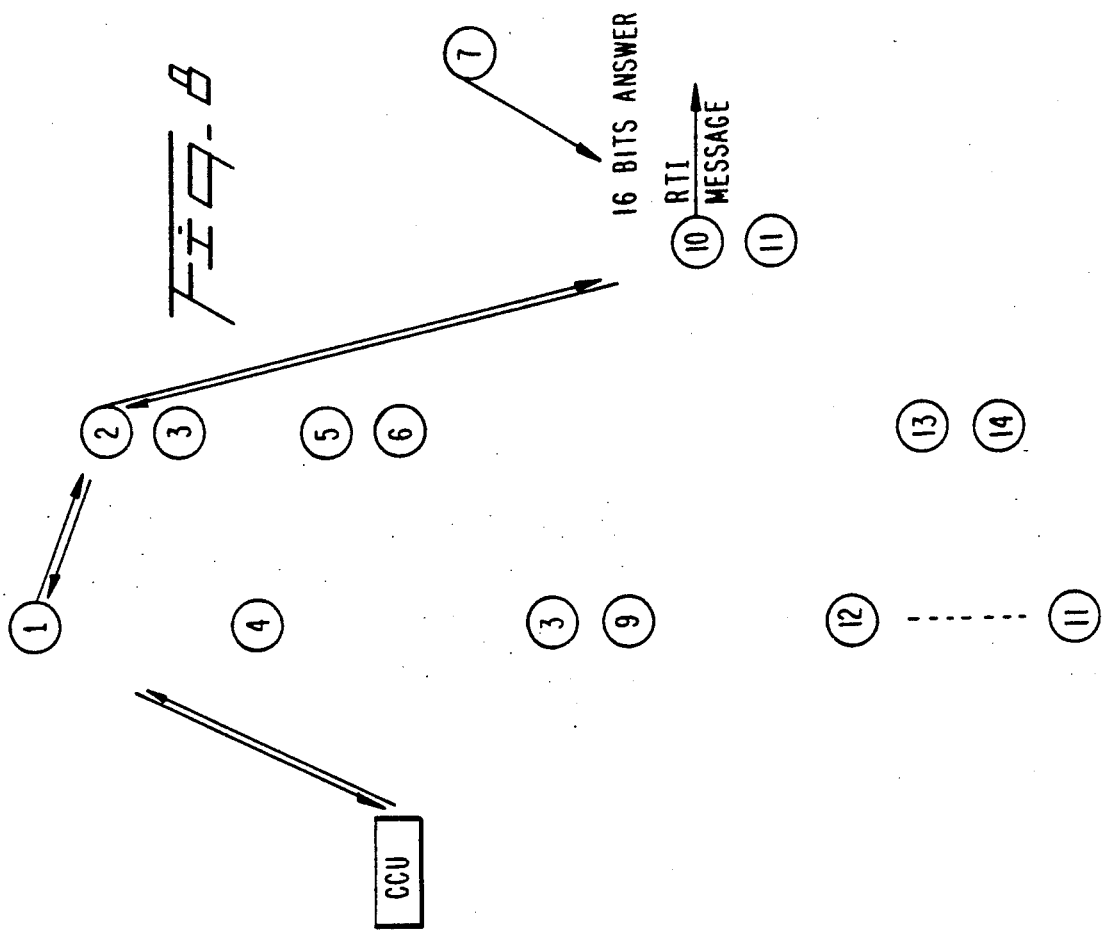
FIG. 8 is a symbolic diagram showing a third level of real time interrogation of the remote units.

CCU 30 requests the relay remote units to download acknowledgment signals that they have received from "downstream" remote units, as provided in step 114 in FIG. 2(a) and as shown in FIG. 6, and to identify any remote units that still are mute (step 116). If there are no remaining mute remote units, the paths to all nodes of the network, thus provided, are stored, in step 109, and the program routine ends (step 110). If there are remaining mute units, determined in step 118, the program returns to step 108 and a second level of relaying is carried out, as shown in FIG. 8, with remote units 32 (2, 3, 5, 6, 13 and 14) now operating as relays to transmit further interrogation signals to the remaining units 32 (7, 10 and 11). Based on acknowledgment signals received from the remaining units by the CCU 30 through 2 levels of relays, as shown in FIG. 8, the CCU now will store the set of paths so far determined, to establish a "map". Remote units that remain "mute" may be attempted to be reached using a different technique, such as individual polling described hereinafter, simply deemed to be outside the range of the network, or else assumed to be defective.

An important aspect of the invention is in selection of the formats of messages, or signal packets, that are transmitted directly between a remote unit and the CCU or between a relay remote unit and the CCU on the one hand, and between relay remote units on the other. Some appreciation of the times involved for transmitting packets in this regard will be helpful.

The number of possible paths between the CCU 30 and remote units 32 can be substantial, particularly when it is considered that the maximum number of nodes that may be typical of a large residential or commercial complex, is 1,000. Because communication is synchronized to the electrical power line, and must be carried out at a low frequency for good noise immunity, preferably at a baud rate of 120 bits per second, the minimum time for two-way communication is four seconds. The amount of time necessary to test all paths can range from several hours to more than one week.

The length of the interrogation message shown in FIG. 5, used during real time interrogation, must be long enough to limit the number of paths found to be active when they in fact are mute. In accordance with the invention the initial interrogation message shown in FIG. 5 is slightly more sensitive, i.e., shorter, than data messages such as are transmitted and received for downloading of meter readings. By reducing message length, the likelihood of an error is reduced, therefore, the probability not to see a valid path is also reduced.

Acknowledgments from the remote units should be as short as possible to reduce the time required to test the total network, but communication on the network also must be reliable. The minimum length of the acknowledgment message can be determined based on the following criteria.

First, three possible messages are required during acknowledgment, one for the regular RTI procedure and two others for alarm purposes. An additional message can be provided to indicate that a correct acknowledgment has not been received, for a total of four possible different messages. Also, it is assumed that no errors are allowed in the message, and that up to 1,000 remote units can be present on the network.

The probability of a wrong detection or probability of a nonexistent word is:

$$P_{wd} = \frac{3 * 1000}{2^M}$$

where M is the number of bit in the message. If it is desired $$P_{wd} \leq 0.1 \ .$$

then $$\frac{3 * 1000}{2^M} \leq 0.1 \longrightarrow 2^M \leq 3 * 10^4$$

and then $$M \leq 14.87$$

The minimum value for M therefore is 15, but in practice, it is more convenient to set M equal to 16.

The first of these three 16 bit words can be chosen randomly. However, it is preferable to choose one word from sets of patterns which have an equal number of "1" and "0". The two others are chosen in such a way that there is a Hamming distance of 8 between each of the four words.

For example:
(1) 1010101010101010
(2) 1100110011001100
(3) 0101101010100101

The distance between (1) and (2) is $d((1),(2))=8$, $d((1),(3))=8$, $d((2),(3))=8$; all remote units use the same messages.

As shown in FIG. 4, following the initial RTI interrogation, the acknowledgment signals $AS_1$, $AS_2$ ... $AS_N$ received in succession by the CCU 30 indicate which remote units are active with respect to the path selected. A dead time following transmission of the RTI interrogation signal and transmission of the first acknowledgment signal by a remote unit, is inserted in the data stream to provide enough time to enable each remote unit to process the received interrogation message and to be ready to supply an answer. Between each acknowledgment transmission is a time gap E that is equal to approximately one bit of time. This gap is necessary because any two points on the electricity power line communication network has zero crossover times, to which transmission and reception are synchronized, that could be slightly different from each other depending on the distance between the two points on the network. The gap also helps compensate for the 60 hertz phase shift present on the power line.

If the same message sent between relays is sent directly from a remote unit to the CCU, the total amount of time required for establishing the quality of a single path is equivalent to the time required to transmit 16,000 bits, since each message requires 16 bits, as determined above, and since there are up to 1,000 remote units. However, because only four messages are possible, two bits are required for encoding; this reduces to a total of 2,000 bits the length of one message from 1,000 remote units. Since a substantial amount of time is still required, several smaller messages are transmitted, having the protocol shown in FIG. 7(b), so that the length of the message is further reduced to from 536 to 632 bits, depending upon the length of the relay address field. Therefore, based on 1,000 remote units, 12 messages are transmitted, each requiring on the order of 5 seconds.

Figure 7B:
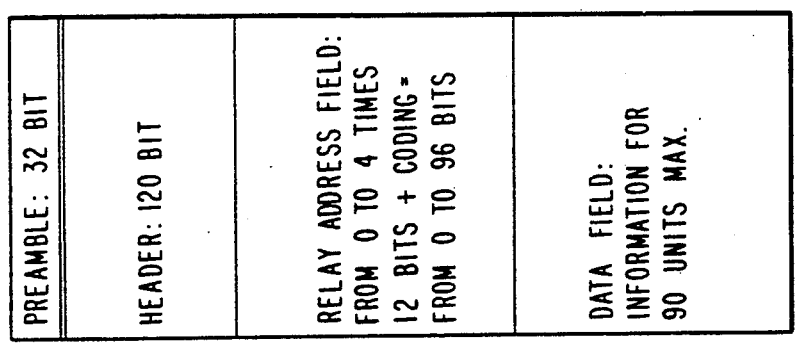
FIG. 7(b) is a diagram of a message packet returned to the CCU by the remote units via a relay unit.
Figure 7A:
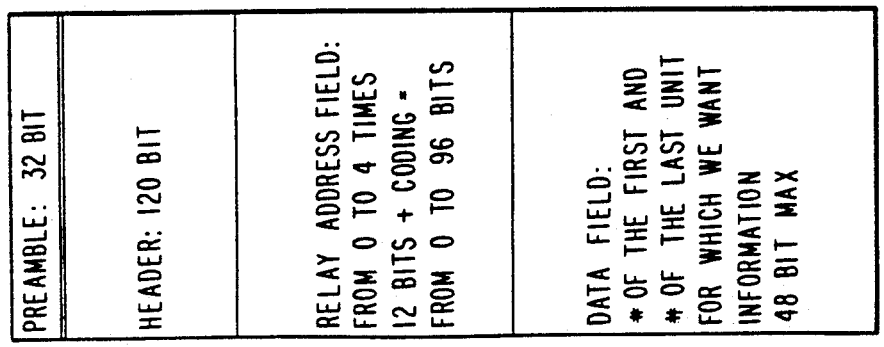
FIG. 7(a) is a diagram of a message packet transmitted by the CCU for interrogating remote units through a relay unit designated by the CCU.

Similarly, based on the message protocol, shown in FIG. 7(a), of signals downloaded by the remote units to the CCU, the maximum length of this divided message is from 224 to 320 bits, depending upon the length of the relay address field. Reducing the amount of data transmitted between relays by transmitting several small messages on request from the central unit, reduces the amount of data to be transmitted and also improves system flexibility because the CCU, in its outgoing message, specifies the ID of the first and last remote units from which the CCU requires information. The relay then transmits back to the CCU a two bit flag in sequence from the first to the last ID specified by the CCU.

Any remote unit, controlled by the CCU 30 to operate as a relay, is maintained normally in a default mode wherein the relay awaits a command from the CCU. If the relay receives a message of a type shown in FIG. 5, namely a real time interrogation signal, the packet received by the relay is analyzed as shown in step 122 in the flow chart of FIG. 2(b). If step 122 determines that the packet has arrived at its destination, the relay is controlled to transmit another real time interrogation message to the remaining remote units. This process is carried out in step 124 by executing steps 100, 102 and 104 in the flow chart of FIG. 2(a), i.e., by broadcasting the interrogation message to all remote units, receiving time staggered acknowledgment messages from the units and identifying those units that are still mute. This signal processing preferably takes place at the CCU 30, but could be processed at the relays.

On the other hand, if the packet is not at its final destination, i.e., the relay is an intermediate relay, the relay field in the packet is modified (step 126) and transmitted to another relay or CCU, as appropriate (step 128).

The default mode for each remote unit, which may be in communication with, an electricity meter, is a standby mode to await a command from either the CCU or a relay. As shown in the flow chart of FIG. 2(c) the packet incoming to the remote unit is detected to read the destination field therein. If the destination field is a broadcast field, as determined in step 132, the remote unit returns an acknowledgment signal to the CCU (step 134). This acknowledgment signal is delayed so that the signal is transmitted during only the time slot associated with the particular unit. Thereafter, the unit returns to the standby mode in step 130. However, if the destination field, detected in step 132, indicates that the packet is at its final destination (step 136), the unit is selected to operate as a relay (step 138); if the unit is not yet operating as a relay, the unit is now controlled by the CCU to operate as one. On the other hand, if the destination ID does not match the ID of the remote unit, the packet is ignored (step 140).

Under some circumstance, wherein relatively few remote units are designated as being mute, it is more efficient to carry out communication path determination by individual polling, rather than by real time interrogation. This is because real time interrogation always "starts from the beginning" with an initial broadcast by the CCU to all remote units. On the other hand, sometimes a number of active paths between the CCU and possibly a large majority of the remote units have already been established. Individual polling enables the paths that are already known to be active to be used to determine new active paths to remote units that are designated as being mute. To select between RTI and individual polling to identify active communication paths to the remote units, the distance between each potential relay and the mute remote unit is determined. If that distance is less than a predetermined distance, to be computed hereinafter, individual polling is used.

Figures 9, 10:
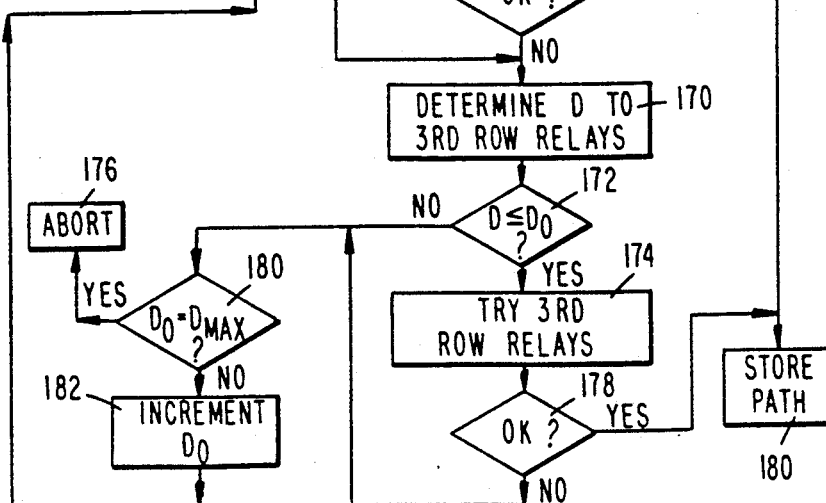
FIG. 9 is a flow chart of programming for carrying out individual polling of remote units on the network.
FIG. 10 is a diagram of a message packet transmitted by the CCU during individual polling of the remote units.
Figure 11A:
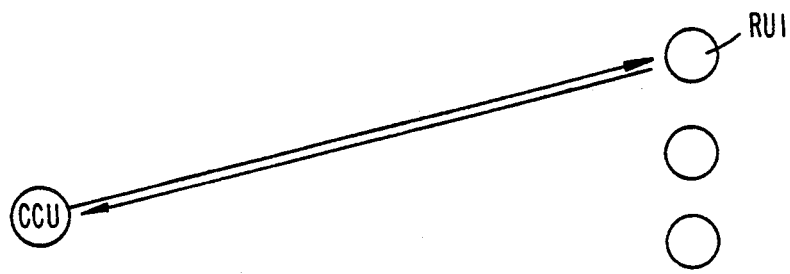
FIG. 11(a)-11(d) are symbolic diagrams showing various levels of relaying during individual polling carried out as shown in FIG. 9.
Figure 11B:
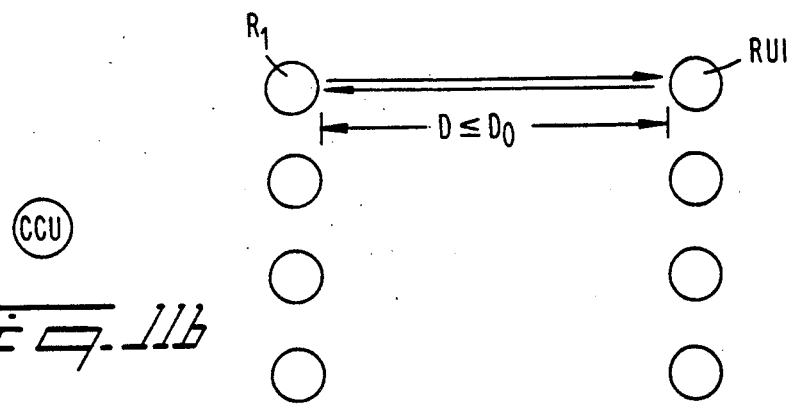
Figure 11C:
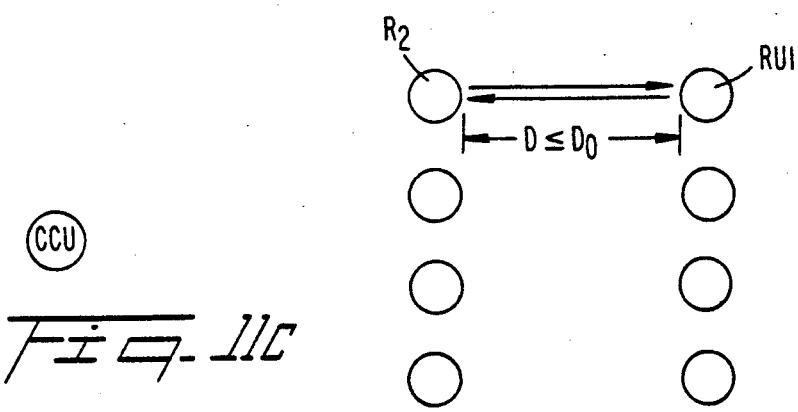
Figure 11D:
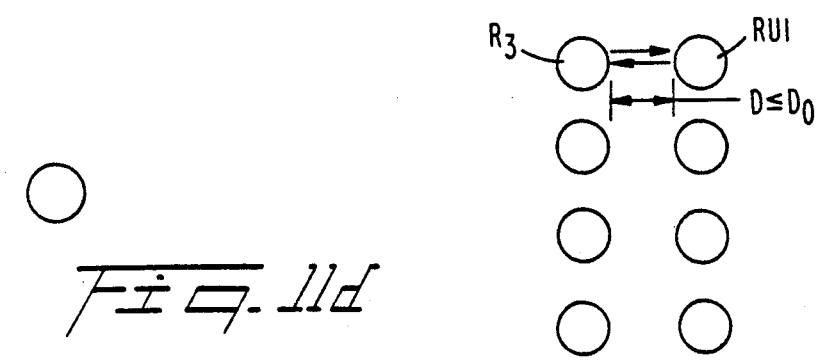

With reference to FIG. 9, programming to carry out individual polling comprises, as a first step, transmitting a message from the CCU 30 to a particular remote unit RUI over a direct path, i.e., not through any relay remote units (step 150). This communication link is shown schematically in FIG. 11(as); the message protocol during this communication has the format shown in FIG. 10. If communication is established, in step 152, the path is stored (step 172); otherwise, the distance D from a first row relay to the remote unit previously designated as being mute, is estimated if possible (step 154), as shown in FIG. 11(b). If the distance is less than a predetermined distance $D_0$, the first row relay attempts to communicate with the mute remote unit (step 158). Assuming that the distance is less than $D_0$, if the first row relay RI establishes a communication with the remote unit RUI, as provided in step 160, the composite path that consists of the path from the CCU to the first relay RI and the path from the first row relay to the remote unit RUI, is stored (step 172). Otherwise, the distance from a second row relay R2 to the remote unit RU1 is estimated, as shown in FIG. 11(c), step 162, and compared in step 164 with the reference distance $D_0$. If step 164 determines that the determined distance is less than the referenced distance, the second row relay attempts to establish communication with the remote unit (step 166). If communication is established, as determined in step 68, the composite path is stored in accordance with step 180; otherwise, the process is repeated in steps 170, 172 and 174 to attempt to establish communication between a third row relay R3 and the remote unit designated as being mute, shown in FIG. 11(d). If communication is established, in step 178, the composite path which now consists of the path from CCU 32 to the first row relay R1, the path from the first row relay to the second row relay R2, the path from the second row relay to the third row relay R3 and the path from the third row relay to the remote unit RU1, is stored in accordance with step 180.

However, if communication from the third row relay R3 and the remote unit RU1 still is not established, in step 178, the process is repeated by increasing the reference distance $D_0$ to $D_1$ and re-executing the steps 150–180. The same process is repeated by increasing the reference distance until either the mute unit is reached or the maximum distance $D_{max}$ possible in the network is reached.

As described, the criterion to select individual polling rather than real time integration, for establishing a communication path to a particular remote unit, depends upon the number of remote units still mute. There is a number also termed a "threshold" herein, under which it is preferable to choose an individual polling.

The maximum length of the message of FIG. 10 used for individual polling is from 152 to 248 bits, depending on the length of the relay address field. If Nmut is a number of mute remote units, and N is the number of remote units in the network, and assuming further that the message length of an RTI is 16 bits, the following expression, when true, indicates that individual polling is faster than RTI.

$$\sum_{k=k_0}^{k_{Nmut}} \sum_{j=k-D_0}^{k+D_0} 2h_j L_{4,j} < \sum_{k=k_0}^{k_{Nmut}} \sum_{j=k-D_0}^{k+D_0} h_j L_{1,j} + 16N +$$

$$\min\left(N_{mut}(L_{3,j} + L_{2,j}^{min}); \delta(L_{3,j} + L_{2,j}^a) + \right.$$

$$\left. \text{int}\left(\frac{N}{90}\right)(L_{3,j} + L_{2,j}^{Max})\right)$$

where $$a = \text{int}\left(\frac{2\left(N - 90 \cdot \text{int}\left(\frac{N}{90}\right)\right) \cdot}{24}\right) + 1$$

$$\delta = \begin{cases} 0 & \text{if } \frac{N}{90} \text{ is integer} \\ 1 & \text{otherwise} \end{cases}$$

k: Identification (ID) of the remote unit to be reached $h_j$ - 1: number of hops necessary to reach the remote unit for which RTI is to be performed $L_{4,j}$: length of the message of the type shown in FIG. 10 with the length of the relay field in accordance with $h_j$ $L_{2j}{}^{min}$: same as $L_{4j}$ but for the message of a type shown in FIG. 7(b) and with a data field length of 1 word of information $L_{2j}{}^{Max}$: with a data field of 15 words of information $L_{2j}{}^a$: with a data field of "a" words of information $L_{3j}$: same as $L_{4j}$ but for the message of a type shown in FIG. 7(a).

As is apparent, the above formula (1) is complex. Alternatively, the following two formulas can provide upper and lower boundaries for determining individual polling.

$$N_{mut}*2L_{4min} < L_{1min} + 16N$$

and for the lowerbound:

$$N_{mut}*8L_{4,Max} < 4L_{1,Max} + 16N + 3L_{3,Max} + 3L_{2,Max}$$

For example, assume that $L_{4,Max} = 248 = L_{1,Max}$
$L_{2,Max} = 680$
$L_{3,Max} = 320$
$N = 1000$
$L_{4min} = 152 = L_{1min}$ Under these Conditions, the upper bound is $N_{mut\text{-}max} = 53$; the lower bound is 10. This means that when $N_{mut}$ is less than 10, it is preferable to use individual polling. However, when $N_{mut}$ is greater than 53, global RTI is preferred. When $N_{mut}$ is between 10 and 53, the exact value must be calculated using formula (1).

It is instructive to compare total times needed to develop a path map using the global RTI and individual polling procedures. For this purpose, it is assumed that the baud rate is 120 bits per second, that the same path is used both for inbound and outbound messages, that the remote units are randomly distributed, that no repetitions take place after a failure and that the reply message is 16 bits in addition to a one bit duration dead time. In this case, the total time required to establish the map for various numbers of remote units is as shown in FIG. 12(a) when there is no relay and using RTI.

FIG. 12(b) shows an example wherein there are up to three relays to reach a remote unit. The number of active paths between layers (rows) is 90%. FIG. 12(c) is similar to FIG. 12(b), but wherein the number of active paths between two layers is 80%. This shows that the variation is not linear, i.e., the total time to develop a map increases substantially faster than the increase in N.

In the table of FIG. 12(d), individual polling is used. This example shows that individual polling is substantially slower than RTI, although individual polling in this example is faster at the second and third relay. This confirms that when the number of remaining units is small, individual polling is faster than RTI.

The amount of time required to establish a map can be reduced using various different techniques. First, global RTI and individual polling can be combined, that is, the better method in each case can be selected. Another improvement can be effected by reducing into several small sets the total number of remote units to be reached by the CCU. By so doing, since the time increase is not a linear function of the number of units, the total time for establishing a map can be substantially reduced.

As another possibility, the procedure can be expedited by having a priori knowledge of network topology. For example, if the CCU has a priori knowledge of the electrical phase and the floor for every unit, the time for establishing a map can be reduced substantially. Finally, the baud rate can be artificially increased, for example, by representing a bit by only one frequency rather than by four frequencies as in the copending application, supra. However, an increased baud rate results in an increased error rate as well.

As an alternative to individual polling to reduce the time required to develop a set of paths to all nodes of the network, another technique, termed "subset global RTI" can be implemented. Subset global RTI, in accordance with the invention, is based on the recognition that if active paths for a large majority of remote units are known, the map built from these paths can be used to identify paths to those remote units that are mute. Accordingly, remote units, operating as relays, and "active", i.e., able to communicate with the CCU, are controlled to broadcast the RTI message having the format shown in FIG. 5, and to perform the same routines as the CCU performs during a global RTI procedure. Because in this example the number of remote units designated as being mute is relatively small, the number of messages of the type shown in FIG. 7(b) is significantly reduced.

A subset global RTI procedure is more effective than individual polling if the number of remote units is determined to be less than the threshold number for global RTI described earlier. The efficiency of the subset global RTI algorithm depends on the repartition of the remote units. For example, if mute remote units are close together, only a few messages of the type shown in FIG. 7(b) are necessary to provide the required information. However, for some configurations even if there are a relatively small number of units designated as being mute in the network, the global and subset global RTI processes can require about the same time to perform. Subset global RTI tends to be advantageous in cases wherein knowledge of the rest of the network is very good and a group of remote units becomes suddenly mute as a result of a new source of noise in the network. If confidence in the predetermined paths of the network is low, it is preferable to implement the global RTI procedure, rather than subset global RTI, even if the number of remote units designated as being mute is small.

By way of recapitulation, initially the CCU has no information on the quality of the network. To establish a set of network paths from the CCU to all the remote units, the CCU implements real time interrogation, i.e., global RTI, together with individual polling or subset global RTI, when appropriate. Each time a network is interrogated, the CCU improves its "knowledge" of the quality of paths to the nodes of the network. However, any path found by an RTI procedure is not necessarily a path that will remain active.

There are two reasons. First, the "quality" of the network probably will vary as a function of time. Second, successful communication along a path, determined during the RTI procedure to be mute, may be active depending upon when communication is initiated. Furthermore, active paths can be missed during the RTI procedure because the messages transmitted during RTI are not the same as those transmitted during normal information transfer, such as meter reading. As a practical matter, the RTI procedure provides an estimation of which paths in the network are active, but the result is inconclusive.

In accordance with an important aspect of the invention, CCU 30 is programmed to implement a "learning process" which develops a network map, with all good paths and no mute ones. In this regard, the term "path" as used herein is a succession of nodes implemented as relays to establish communications between the CCU and a remote unit. A "direct path" is a direct link between the CCU and the remote unit. A "map" is a list or set of paths to describe a network. Several different maps represent the same network at different times, to correspond to changing line conditions. For example, there may be one map for the day and another one for the night, and still others for summer and winter.

Network variations that require different network maps generally are cyclic. For example, in an industrial environment, line conditions generally are the same from 8 a.m. to 5 p.m. each weekday. In accordance with the invention, maps that describe the network at different times and under different line conditions are stored in memory. Current conditions are analyzed, and a suitable map is selected from memory, to establish a set of paths to all remote units that, based on experience as a result of former RTI implementations, are likely to be successful.

Accordingly, an important aspect of the learning process to be described herein is to ascertain similarities, i.e., to analyze the cycles and to store in memory a valid map for each of them. The learning process must also have the ability to select the right map at the right time, to establish a communication network that is likely to be successful at any given time.

Maps are stored, in accordance with the invention, by storing the image of a network in terms of "logical distance" between the CCU and the remote units in the network. A logical distance is different from a physical distance which represents the geographical distance, in the field, between two units. Physical distance, although conceptually convenient, is difficult to implement since geographical distance is not usually measured during installation. Logical distance, on the other hand, is a number that directly represents the quality of communication between the CCU and a particular remote unit, and the number of relays necessary to reach that unit. In accordance with the learning process, the CCU performs a number of RTI processes, and accumulates readings in order to build a map with coefficients of confidence in the paths that determine which units can communicate with each other and which cannot.

A "logical area" is defined herein as a region of the network wherein each element can communicate with al other elements. Some of the elements may also be able to communicate with units outside the logical area. This subset of remote units represents a set of relay units that may, if necessary, be used by the CCU to communicate with the elements of the logical area. An exemplary map of a single phase low voltage network is shown in FIG. 13. One possible characterization of that map in terms of logical areas, that might be determined by implementation of the RTI process and stored in a data base, is as follows.

$A' = \{1,2,3,4,5,6,7,9,11,14,15,17,18\}$; $B' = \{4,5,6,7,8\}$;
$C' = \{10,11,12,13,\}$; $D' = \{17,18,19,20,21,22,23,24,25\}$;
$E' = \{15,16,26,27,28,30,31,32,33,34\}$ thus
$A' \cap B' = \{4,5,6,7\}$; $A' \cap C' = \{11\}$; $A' \cap D' = \{17,18\}$;
$A' \cap E' = \{15\}$;
$B' \cap C' = \{\emptyset\}$; $B' \cap D' = \{\emptyset\}$; $B' \cap E' = \{\emptyset\}$;
$C' \cap D' = \{\emptyset\}$; $C' \cap E' = \{\emptyset\}$; $D' \cap E' = \{\emptyset\}$ The logical areas thereby obtained are shown in FIG. 14. An intersection of two of the sets corresponds to a set of units that can be used as relays. The logical areas set forth in this example show that (1) elements of set $A'$ are always reached directly, (2) elements of sets $B'$, $C'$, $D'$ and $E'$ almost always require one relay and (3) every intersection of sets $B'$, $C'$, $D'$ and $E'$ is empty, i.e., no communication is possible between these sets. Each map stored in the data base accordingly is capable of describing the paths to all nodes of a network.

In general, to implement the learning process for implementing maps stored in the data base to establish, in a short period of time, a set optimum path adapted to particular network conditions, the following procedure is carried out. First, the quality of a path is estimated, and is rejected if the quality of the path is considered to be inadequate. Lists of paths are organized into maps, and new paths are established. If necessary, transmissions for establishing a new path are retried. Then, cycles of similar line conditions are ascertained to be able to forecast which maps should, with a high coefficient of confidence, be used at any given time. Finally, it must be confirmed that enough time remains following optimizing the quality of paths, for carrying out background tasks.

To estimate the quality of a path, a coefficient corresponding to the confidence that is had in the path is calculated, and then a rejection criterion is applied. After each communication is carried out, the corresponding coefficient is updated.

Figures 15, 16, 17:
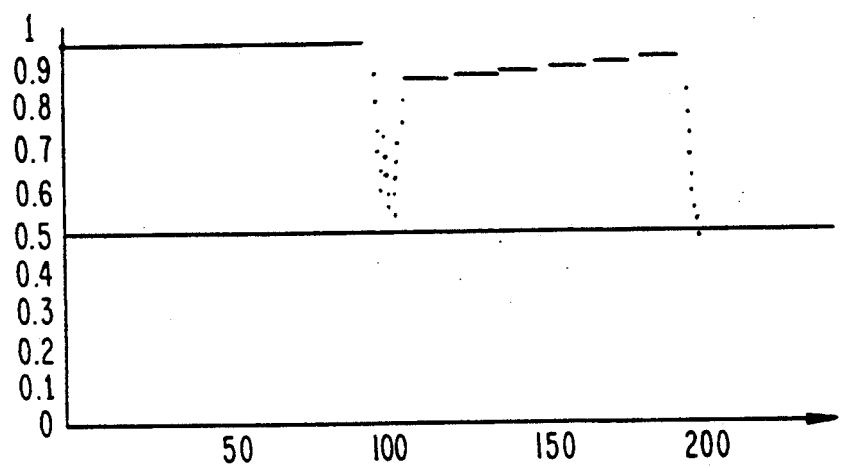
FIG. 15 is a table showing the relationship between bit error rate and message error rate for establishing a message rejection criterion to assess the quality of a map.
FIG. 16 is a graph of the ratio of the number of received messages to the number of transmitted messages as a function of the number of transmitted messages on the network.
FIG. 17 is a symbolic view of maps stored in "stacks" in a data base.

In accordance with one aspect of the invention, to determine the rejection criterion used to determine whether a path is accepted or rejected, the "message error rate" (MER) is measured. Assuming that R is equal to the ratio between the number of received messages and the number transmitted at the CCU side of the path, then the quantity (1-R) is equal to the message error rate, which is a function of different bit error rates along the path. The MER of any path, having frequency hopping type spread spectrum communication thereon as described in the copending application, is given by the following formula.

$$P_c = \left( \prod_{j=1}^{h} \left( 1 - \left( \left( 1 - \sum_{l=0}^{p} C_l^s (BER_j)^l (1 - BER_j)^{s-l} \right) \left( 1 - \sum_{i=0}^{k} C_i^n (BER_j)^i (1 - BER_j)^{n-i} \right) \right)^{m_j} \right) \right)^2 = 1 - R$$

wherein:

$C_i^n = \dfrac{n!}{(n-i)!i!}$ $n$: the number of bits per word, e.g., $n = 24$ $k$: number of bits in error which can be corrected in a word, e.g., $k = 3$ $m_j$: number of words in a message during a hop number $j$ $h$: total number of hops along the path $p$: number of bits in error accepted in the sync. pattern, e.g., $p = 4$ -continued s: number of bits in the sync. pattern
$BER_j$: Bit Error Rate during hop number $j$ With the MER thus established, a rejection criterion will depend upon whether the quantity (1-R) is above or below a particular threshold. For example, the threshold may after three tries be set at a message error rate of 10 percent. As shown in FIG. 15, this corresponds to a bit error rate of between 5.5% and 6%, or to a probability to receive a message correctly after the first try of between 44.4% and 50%. The rejection criterion accordingly must be based on R and the acceptable message error rate.

As another consideration, calculation based on a simple ratio, like R, requires a long time to reduce the average by a given value. This "memory effect" must be minimized, i.e., after a given number of tries, despite the history, if communication is still impossible, a new path must be searched. This number of unsuccessful tries can reasonably be chosen to be equal to 9, i.e., 3 reading attempts of 3 tries each. As a practical matter, if the maximum number of tries is greater, the time response to compute the algorithm is too long; if the maximum number of tries is fewer, then the algorithm will be too sensitive to temporary disturbances. Retries can be evenly spaced, but preferably are distributed unequally in time, as discussed hereinafter.

A good criterion is to maintain the same path until the following relation is determined to be false.

$$A = Re^{-R\frac{C}{a}} < 0.5$$

wherein:

$$R = \frac{\text{Number-of-received-messages}}{\text{Number-of-transmitted-messages}} = \frac{N_{rm}}{N_{tm}}$$

$$C = \begin{cases} C + 1 & \text{after each failure} \\ C - 1 & \text{after each success} \\ 0 & \text{if it is a success and } C = 0 \end{cases}$$

So $C_{Max} = 9$ and $C_{min} = 0$.

If the parameter "a" is equal to 13, and if R=1, i.e., no errors have been recorded, then the number of failed communication attempts before the path is rejected, is equal to three reading attempts of three tries each. A plot of the value of R as a function of the number of transmitted messages, is shown in FIG. 7.

As described earlier, a map is a set of paths from the CCU to every node of the network. Because there may be several paths available to each node, no map necessarily is unique. This is because conditions of transmission are not constant; no path is unique. Organization of maps is implemented in the data base by dividing each map into data "stacks" as shown in FIG. 17. Each stack is dedicated to a unique slice of time when conditions on a network, or at least on the path between the node and the CCU, are constant. Which "stack" is best depending on the time when the inquiry is made. In the preferred embodiment, the depth of the stacks for each node is limited to three. Each stack contains a list of different possible paths for the same destination together with corresponding data $C_1$, $C_2$, $C_3$, that characterize an attribute of the map such as the time period, or network condition that prevailed, when the map was made.

Assume that a predetermined path becomes mute. To establish a new path, there are two possibilities.

First, another RTI can be implemented. Depending on the number of nodes that remain mute, the interrogation technique can be either a global real time interrogation or an individual polling, as described earlier. However, assuming that up to 1,000 remote units are distributed on the network, a substantial period of time is required in either implementation. On the other hand, either implementation establishes a new path for every remote unit. These paths are stored in the data base memory as a set, or map, and can be used later when the same network conditions recur.

Figure 19:
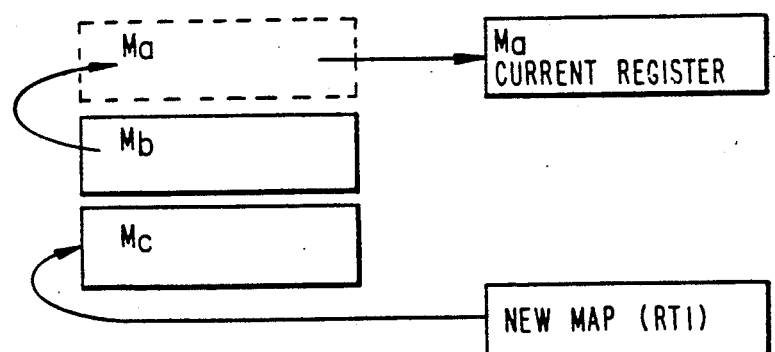
FIG. 19 is a diagram showing, symbolically, commutation between maps during rerouting of network paths.

Second, another path already in the stack can be used to develop a current path. The path fetched from the stack must, of course, be different from the one currently rejected. For example, as shown in FIG. 19, it is practical to select a path that was found from the top of the stack, for placement into a current register; the remaining elements of the stack are shifted by one. As another possibility, after an RTI is implemented, if the current path has been rejected, the result of RTI is placed in the current register and will be considered to be the new path. If the current path is still being utilized, then the result of the RTI is placed at the bottom of the stack (FIG. 19), if there is room. Again, to be placed in the stack, the new path must be unique.

Figure 18A:
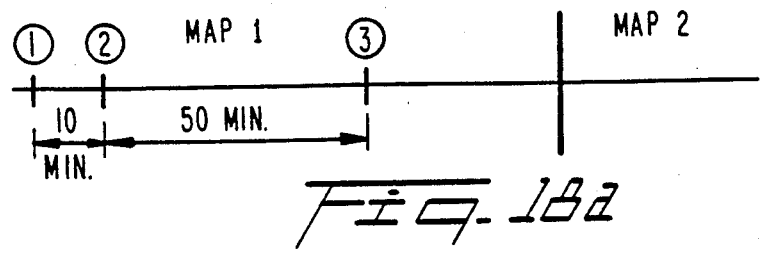
FIGS. 18(a) and 18(b) are timing diagrams respectively for retries during a common map period and retries during a change of map.
Figure 18B:
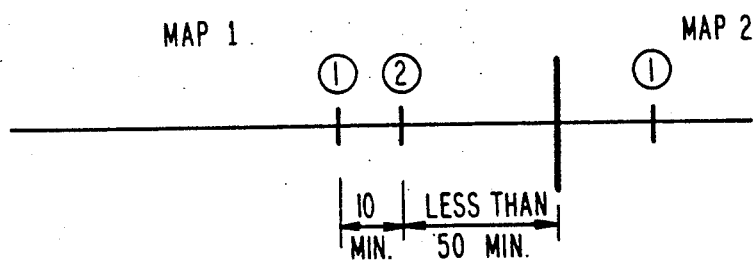

When an attempt at communication with a remote unit on a path has failed, the communication is retried. If any communication fails, it is retried twice in succession, for a total of three tries per attempt. During this period, the characteristics of the network are substantially constant. Following three unsuccessful attempts of three tries each, on the other hand, the repetition schedule preferably is varied since it is recognized that any failure may have occurred as a result of temporary disturbances on the network and that variations in network characteristics generally are slow. Accordingly, if the first attempt fails, and the rejection criterion remains true, a second attempt is made following a ten minute delay. However, if the second attempt fails, and the rejection criterion is still true, another attempt is made following a 50 minutes delay. This procedure is shown schematically in FIG. 18(a). FIG. 18(b) shows the retry procedure that will take place during a change of the map.

Commutation from one map to another must be carried out when line conditions have changed. Initially, the system contains no data indicating when commutation between maps is necessary. Commutation times presumably are cyclic, occurring daily, weekly, by season, etc., but various cycles are intermixed. For example, the daily cycle is contained within the weekly cycle which in turn is contained within the seasonal cycle.

For example, assuming that the maximum cycle length is two months, and that two or three paths each day may be necessary, a total of 186 maps must be stored in a database. A map is formed by N stacks of 3 paths each, where N is the number of nodes in the network. Assuming that each path contains five addresses of two bytes each, the memory requirement for the database is $N \times 186 \times 3 \times 5 \times 2 = N \times 5,580$. Since N may be as high as 1,000, the maximum memory requirement for the database is 5.5 megabytes. In addition, a file containing the time and corresponding data $C_1$, $C_2$, $C_3$ (FIG. 17), such as a date stamp of every commutation time, must be stored. The length of the date stamp for the maps, requiring just a couple of kilobytes, is negligible.

Figure 20:
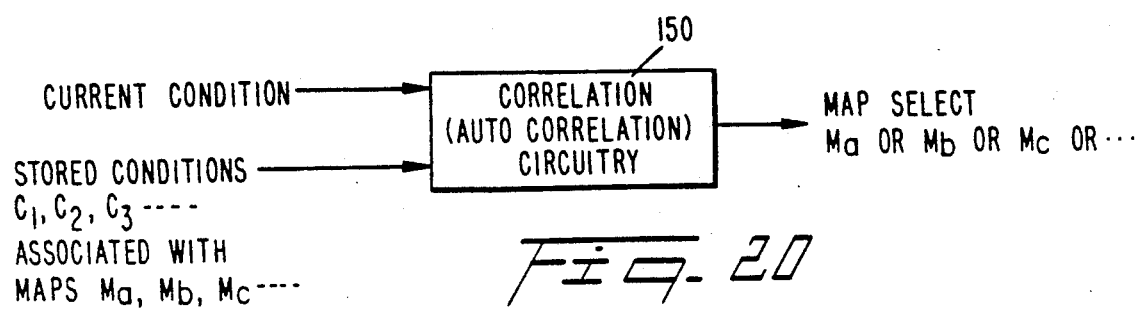
FIG. 20 is a simplified block diagram of a system for carrying out map selection using correlation.

To determine the cycles that can be used for commutation, correlation and autocorrelation algorithms are implemented in conventional circuitry 150 such as is shown in FIG. 20, to convert the search for temporal cycles into a search for maxima. However, these algorithms require a large number of samples, so that there is a transition period at the beginning of the existence of a system when specific commutation from one stack to another at a precise time will not exist. Thereafter, mapping is carried out progressively, with short cycles, e.g., daily cycles, being found first, then weekly cycles, etc. Long cycles, e.g., semiannually, will not be taken into consideration because the likelihood of any map remaining valid for an extended period of time is small.

It is important to expedite convergence of the system to a particular map. This is because some nodes are difficult to reach in a reasonable amount of time using global RTI. Accordingly, it may happen that an excessive amount of time is spent attempting to determine a path for mute units, so that no other time is available for downloading data from the units. To prevent this from occurring, all paths that have already failed are maintained in memory to insure that those paths are not reconsidered if an RTI provides the same result.

The number of RTI implementations carried out in succession must also be limited. In addition, higher priority should be given to certain functions, such as meter reading, than others such as path determination. Other techniques to increase the speed of convergence can be used.

To carry out a downloading of data from each remote unit each day, as is important in meter reading, it must be ensured that the search for a path to reach every unit will converge as quickly as possible. There are several techniques contemplated in this invention.

For example, during an RTI, rather than sequentially polling every unit by its identification number, it is preferable to poll the units randomly. This avoids locating the same path repetitively only because the path is first on the list. When a path fails, all other paths that were using the failed path as a subset path must be changed in order to use the new path instead.

The stack of the paths should be small, e.g., no greater than 3 in depth as mentioned earlier. As a practical matter, all the paths in a stack are established while communication conditions are substantially constant. If conditions suddenly change dramatically, every path available in the stack are tried prior to conducting another RTI. In this example, testing the additional stacks represents a waste of time; this is why the depth of the stack should be small.

When the number of remote units is very high, the period of time required to perform an RTI is so long that it may not be possible to download each unit every day. As one solution, the total number of remote units can be divided into separate independent groups that cannot communicate with each other. For example, three groups corresponding to the three phases of an electrical network, can be designated. The CCU will reprogram every identification number and associated delays of a remote unit so that all units of the same group respond in sequence without a dead time between them. The total time to perform a global RTI thereby is reduced by a divisor equivalent to the number of independent groups designated.

There accordingly has been provided an adaptive network for communication on a network, such as electrical power lines, that tend to be exposed to periodic disturbances. Communication paths between a CCU and remote units on the network are established initially by real time integration wherein units near other remote units designated as being mute are controlled by the CCU to operate as relays. Modifications, such as subset global RTI and individual polling, are implemented to reduce the amount of time required to establish a set of paths, or a map, corresponding to each node of the network. The system implements a "learning process" wherein a record of every communication is maintained in the form of maps stacked in a data base memory. When conditions resemble conditions that existed when a particular map of the database was made, that map is first selected to establish the communication paths. If the map selected is not acceptable, based on a preestablished rejection criterion, another map in the stack is selected and tested.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. A method of routing communications between a central control unit (CCU) and a plurality of remote units distributed on an electrical power line, said CCU and remote units being capable both of receiving and transmitting electrical signals, comprising the steps of (a) by said CCU, transmitting on the power line a first interrogation signal to be received by said plurality of remote units on said line;

(b) by each of said remote units that have received said first interrogation signal, transmitting on the power line a first acknowledgement signal that is capable of being discriminated from first acknowledgement signals of the other remote units;

(c) by said CCU, receiving said first acknowledgement signals transmitted by said remote units that have received said first interrogation signal, associating said transmitted first acknowledgement signals with corresponding remote units and determining from which of said remote units, designated as being "mute", a first acknowledgement signal has not been received;

(d) by said CCU, selecting a remote unit to operate as a first relay and controlling the first relay to transmit a second interrogation signal to the remote units designated as being mute;

(e) by said remote units designated as being mute, upon receipt of said second interrogation signal, transmitting on the power line a second acknowledgement signal to be relayed by said first relay to said CCU; and (f) repeating steps (d) and (e) in sequence until one of said remote units are designated as being mute.

2. The method of claim 1, including following step (f), the additional steps of, by said CCU, transmitting a first message signal to be received by said plurality of remote units directly or via said relays and, by said remote units in response to a receipt of said first message signal, transmitting a second message signal to be received by said CCU directly or via said relays.

3. The method of claim 1, wherein step (f) is repeated only twice.

4. The method of claim 1, wherein step (f) designates first, second and third levels of relays at locations successively farther displaced from said CCU, including polling any remaining remote units designated as being mute, by carrying out the additional steps of (g) determining a first distance between a remote unit redesignated to be a first level relay and a remote unit designated as being mute, and if the first distance is less than a first predetermined distance, carrying out a first bidirectional signal transfer between said first level relay and said remote unit designated as being mute;

(h) if said first bidirectional signal transfer is unsuccessful, determining a second distance between said second level relay and said remote unit designated as being mute, and if the second distance is less than a second predetermined distance, carrying out a second bidirectional signal transfer between said second level relay and said remote unit designated as being mute; and (i) if said second bidirectional signal transfer is unsuccessful, determining a third distance between said third level relay and said remote unit designated as being mute, and if the third distance is less than a third predetermined distance, carrying out a third bidirectional signal transfer between said third level relay and said remote unit designated as being mute.

5. The method of claim 4, wherein said first, second and third predetermined distances are a common reference distance.

6. The method of claim 5, including the additional step of increasing said common reference distance and then repeating steps (g)–(i).

7. The method of claim 4, including the additional step of computing a threshold number of remote units designated as being mute for carrying out polling thereof, and carrying out polling of said mute remote units in response to said computing step.

8. The method of claim 1, including the steps of (g) by one of said remote units selected by said CCU to operate as a first relay, transmitting on the power line a third interrogation signal to be received by said remote units designated as being mute on said line;

(h) by each of said remote units that have received said third interrogation signal, transmitting said acknowledgement signal that is capable of being discriminated from acknowledgement signals of the other remote units;

(i) by said remote unit selected by said CCU to operate as a first relay, receiving said third acknowledgement signals transmitted by said remote units that have received said third interrogation signal, associating said transmitted third acknowledgement signals with corresponding remote units and determining from which of said remote units, designated as still being mute, a fourth acknowledgement signal has not been received;

(j) by said remote unit selected by said CCU to operate as a relay, selecting a second level of remote unit in proximity to at least one of said still mute remote units to operate as a second relay and transmitting via the second relay a further interrogation signal to the remote units designated as being still mute;

(k) by said remote units designated as being still mute, upon receipt of said further interrogation signal transmitting on the power line a further acknowledgement signal to be relayed by said second relay to said first; and (l) repeating steps (j) and (k) in sequence until none of said remote units are designated as being still mute.

9. The method of claim 1, including the step of repeating transmissions of interrogation signals by said CCU of inquiry signals if no corresponding acknowledgements signals are received from remote units by said CCU.

10. The method of claim 1, including route learning for developing maps of sets of successful routes between said central unit and said remote units as a function of time, including the steps of storing maps of successful communications routes between said CCU and remote units, obtaining associated data and, in response, selecting a particular map for routing a transmission between said CCU and a corresponding remote unit.

11. The method of claim 10, wherein said associated data include a confidence factor for each map describing the probability that communications between said CCU and said remote unit along a path defined by said each map during a particular time period will be successful.

12. The method of claim 11, wherein a plurality of said maps corresponding to a common period of time are stored in a data base.

13. The method of claim 12, wherein said confidence factor for each map is determined by measuring the percentage of successful communications between said CCU and remote units during a particular time.

14. A power line communication system for communications between a central control unit (CCU) and a plurality of remote units distributed on a power line, comprising:

means controlled by said CCU for applying on said power line inquiry signals to be received by said plurality of remote units;

means controlled by said remote units and responsive to a receipt of said inquiry signals for applying on said power line corresponding acknowledgement signals;

at least some of said remote units each further including means for relaying on the power line said inquiry signals from said central unit and said acknowledgement signals from the other ones of said remote units; and said CCU including routing control means for establishing a communication path for said inquiry signals between said central unit and all of said plurality of remote units, said routing control means including means for (a) controlling said CCU to apply on said power line a first inquiry signal to be received by said plurality of remote units;

(b) controlling each one of said plurality of remote units that has received said first inquiry signal to transmit a first acknowledgement signal on said power line to said CCU;

(c) determining whether said first acknowledgement signal from each of said remote units has been received by said CCU, wherein each remote unit from which said first acknowledgement signal has not been received is designated as "mute";

(d) controlling said CCU to select one of said remote units which is near a mute remote unit and is not "mute" to operate as a relay remote unit;

(e) controlling said relay remote unit to transmit a second inquiry signal to be received by the other ones of said remote units;

(f) controlling said remote units that have received said second inquiry signal to transmit second acknowledgement signals on said power line to be received by said relay remote unit;

(g) controlling said relay remote unit to relay said second acknowledgement signals to said CCU;

(h) determining whether said second acknowledgement signal from each of said "mute" remote units has been received by said CCU, wherein each remote unit from which said second acknowledgment signal has not been received is designated again as being "mute";

(i) repeating (e)-(h) while controlling other ones of said remote units that are not "mute" to transmit said second acknowledgement signal to said CCU until none of said plurality of remote units are "mute"; and (j) establishing, directly or through said relay remote units, a set of power line communication paths between said CCU and each of said remote units.

15. The system of claim 14, wherein said other ones of said remote units controlled by said routing control means in (i) are located logically or electrically near remote units determined to be mute.

16. The system of claim 15, wherein said first acknowledgement signals applied to said power line by said remote units are time-division multiplexed and wherein said second acknowledgement signals applied to said power line by said remote units are also time-division multiplexed.

17. The system of claim 14, wherein said routing control means includes further means for controlling said CCU to transmit a relay designation signal to a remote unit designated to be a relay remote unit, means responsive to said relay designation signal for controlling said remote unit to operate as a relay remote unit and means for controlling said last named relay remote unit to transmit a confirmation signal to said CCU to confirm operation of said last named remote unit as a relay remote unit.

18. The system of claim 14, wherein said routing control means includes means for controlling said CCU to repeat transmissions of inquiry signals therefrom if no corresponding first or second acknowledgement signal is thereafter received by said CCU.

19. The system of claim 14, including route learning means for developing maps of sets of successful paths between said CCU and said remote units, means for storing said maps together with associated reference data, means for receiving real time data and means for selecting particular maps for routing transmissions between said CCU and said remote units in accordance with said stored reference data and real time data.

20. The system of claim 19, wherein said real time data include a confidence factor for each map describing the probability that communications between said CCU and said remote units along a path defined by said each map during a particular time period will be successful.

21. The system of claim 20, wherein a plurality of said maps corresponding to different periods of time are stored in a data base.

22. The system of claim 20, wherein said confidence factor for each map is determined by measuring the percentage of successful communications between said CCU and said remote units during a particular period of time.

23. The system of claim 20, wherein data transmitted by a remote unit or relay remote unit to said CCU has a format different from that of data transmitted between relay remote units.

24. A system for routing communications between a central control unit (CCU) and a plurality of remote units distributed on an electrical power line, said CCU and remote units being capable both of receiving and transmitting electrical signals, comprising:

first means connected with said CCU for transmitting on the power line a first interrogation signal to be received by said plurality of remote units on said line;

second means connected with each of said remote units and responsive to a receipt of said first interrogation signal for transmitting an acknowledgement reply signal that is capable of being discriminated from acknowledgement signals of the other remote units;

third means connected with said CCU and responsive to a receipt of said first acknowledgement signals transmitted by said remote units that have received said first interrogation signal for associating said transmitted first acknowledgement signals with corresponding remote units and determining from which of said remote units, designated as being "mute", a first acknowledgement signal has not been received;

fourth means connected with said CCU for selecting a remote unit in proximity to at least one of said mute remote units to operate as a first relay;

fifth means for transmitting, via the first relay, a second interrogation signal to the remote units designated as being mute; and sixth means connected with said remote units designated as being mute and responsive to a receipt of said second interrogation signal for transmitting on the power line a second acknowledgement signal to be relayed by said first relay to said CCU.

25. The system of claim 24, including seventh means connected with said CCU for transmitting a first message signal to be received by said plurality of remote units directly or via said relays, and means connected with said remote units and responsive to a receipt of said first message signal for transmitting a second message signal to be received by said CCU directly or via said relays.

26. The system of claim 25, including eighth means, connected with said CCU, for polling remaining remote units designated as being mute by (a) designating selected ones of said remote units as first, second and third level relays;

(b) determining a first distance between a remote unit designated to be a first level relay and a remote unit designated as being mute, and if the first distance is less than a first predetermined distance, carrying out a first bidirectional signal transfer between said first level relay and said remote unit designated as being mute;

(c) if said first bidirectional signal transfer is unsuccessful, determining a second distance between a remote unit designated to be a second level relay and said remote unit designated as being mute, and if the second distance is less than a second predetermined distance, carrying out a second bidirectional signal transfer between said second level relay and said remote unit designated as being mute; and (d) if said second bidirectional signal transfer is unsuccessful, determining a third distance between said a remote unit designated to ba a third level relay and said remote unit designated as being mute, and if the third distance is less than a third predetermined distance, carrying out a third bidirectional signal transfer between said third level relay and said remote unit designated as being mute.

27. The system of claim 26, wherein said first, second and third predetermined distances are a common reference distance.

28. The system of claim 27, including ninth means connected with said CCU for increasing said common reference distance and then repeating functions (b)-(d).

29. The system of claim 28, including tenth means for computing a threshold number of remote units designated as being mute for carrying out polling thereof, and for carrying out polling of said mute remote units in response to said computing means.

30. The system of claim 29, including eleventh means for repeating transmissions of interrogation signals by said CCU if no corresponding acknowledgements signals are received from remote units by said CCU.

31. The system of claim 24, including route learning means for developing maps of sets of successful paths between said CCU and said remote units as a function of time, including means for storing maps of sets of successful communications paths between said CCU and remote units, means for obtaining associated reference data, and means based on said associated reference data for selecting particular maps for routing transmissions between said CCU and said remote units.

32. The system of claim 31, wherein said associated reference data include a confidence factor for each map describing the probability that communications between said CCU and said remote units along a path defined by said each map during a particular time period will be successful.

33. The system of claim 32, including data base means for storing a plurality of said maps corresponding to different periods of time.

34. The system of claim 33, including means for determining said confidence factor for each map by measuring the percentage of successful communications between said CCU and said remote units during a particular time period.

* * * * *